(12) United States Patent
Raghavan et al.

(10) Patent No.: US 11,546,031 B2
(45) Date of Patent: Jan. 3, 2023

(54) REPORTING WIDE BANDWIDTH OPERATION FOR BEAMFORMING

(71) Applicant: QUALCOMM Incorporated, San Diego, CA (US)

(72) Inventors: Vasanthan Raghavan, West Windsor Township, NJ (US); Tao Luo, San Diego, CA (US); Alexander Dorosenco, El Cajon, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1 day.

(21) Appl. No.: 17/308,314

(22) Filed: May 5, 2021

(65) Prior Publication Data

US 2021/0367649 A1 Nov. 25, 2021

Related U.S. Application Data

(60) Provisional application No. 63/028,469, filed on May 21, 2020.

(51) Int. Cl.
| | |
|---|---|
| *H04B 7/06* | (2006.01) |
| *H04W 72/04* | (2009.01) |
| *H04L 5/00* | (2006.01) |
| *H04W 24/08* | (2009.01) |
| *H04W 64/00* | (2009.01) |

(52) U.S. Cl.
CPC ......... *H04B 7/0617* (2013.01); *H04L 5/0048* (2013.01); *H04W 24/08* (2013.01); *H04W 64/00* (2013.01); *H04W 72/044* (2013.01)

(58) Field of Classification Search
CPC .... H04B 7/0617; H04B 7/063; H04B 7/0695; H04L 5/001; H04L 5/0048; H04L 5/0094; H04W 24/08; H04W 64/00; H04W 72/044

See application file for complete search history.

(56) References Cited

U.S. PATENT DOCUMENTS

| | | | |
|---|---|---|---|
| 2019/0335445 A1* | 10/2019 | Forenza | H04B 7/024 |
| 2020/0304253 A1* | 9/2020 | Choi | H04L 5/0023 |

FOREIGN PATENT DOCUMENTS

| | | |
|---|---|---|
| WO | WO-2007062933 A1 | 6/2007 |
| WO | WO-2019059739 A1 | 3/2019 |
| WO | WO-2021066688 A1 | 4/2021 |

OTHER PUBLICATIONS

Partial International Search Report—PCT/US2021/031063—ISA/EPO—dated Aug. 2, 2021.
International Search Report and Written Opinion—PCT/US2021/031063—ISA/EPO—dated Sep. 23, 2021.

\* cited by examiner

*Primary Examiner* — Siu M Lee

(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may transmit, to a base station, an indication of a range of frequencies outside an operational bandwidth of the UE based at least in part on the range of frequencies being compatible with one or more sets of analog beamforming beam weights associated with the operational bandwidth. The UE may communicate, with the base station, based at least in part on transmitting the indication of the range of frequencies outside of the operational bandwidth of the UE. Numerous other aspects are provided.

30 Claims, 7 Drawing Sheets

REPORTING WIDE BANDWIDTH OPERATION FOR BEAMFORMING

CROSS-REFERENCE TO RELATED APPLICATION

This patent application claims priority to U.S. Provisional Patent Application No. 63/028,469, filed on May 21, 2020, entitled "REPORTING WIDE BANDWIDTH OPERATION FOR BEAMFORMING," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for reporting wide bandwidth operation for beamforming.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include transmitting, to a base station, an indication of a range of frequencies outside an operational bandwidth of the UE based at least in part on the range of frequencies being compatible with one or more sets of analog beamforming beam weights associated with the operational bandwidth; and communicating, with the base station, based at least in part on transmitting the indication of the range of frequencies outside of the operational bandwidth of the UE.

In some aspects, a method of wireless communication, performed by a base station, may include receiving, from a UE, an indication of a range of frequencies outside an operational bandwidth of the UE that are compatible with one or more beam weights associated with the operational bandwidth of the UE; and communicating, with the UE, based at least in part on receiving the indication of the range of frequencies outside the operational bandwidth of the UE.

In some aspects, a UE for wireless communication may include a memory and one or more processors coupled to the memory. The one or more processors may be configured to transmit, to a base station, an indication of a range of frequencies outside an operational bandwidth of the UE based at least in part on the range of frequencies being compatible with one or more sets of analog beamforming beam weights associated with the operational bandwidth; and communicate, with the base station, based at least in part on transmitting the indication of the range of frequencies outside of the operational bandwidth of the UE.

In some aspects, a base station for wireless communication may include a memory and one or more processors coupled to the memory. The one or more processors may be configured to receive, from a UE, an indication of a range of frequencies outside an operational bandwidth of the UE that are compatible with one or more beam weights associated with the operational bandwidth of the UE; and communicate, with the UE, based at least in part on receiving the indication of the range of frequencies outside the operational bandwidth of the UE.

In some aspects, a non-transitory computer-readable medium may store one or more instructions for wireless communication. The one or more instructions, when executed by one or more processors of a UE, may cause the one or more processors to transmit, to a base station, an indication of a range of frequencies outside an operational bandwidth of the UE based at least in part on the range of frequencies being compatible with one or more sets of analog beamforming beam weights associated with the operational bandwidth; and communicate, with the base station, based at least in part on transmitting the indication of the range of frequencies outside of the operational bandwidth of the UE.

In some aspects, a non-transitory computer-readable medium may store one or more instructions for wireless communication. The one or more instructions, when executed by one or more processors of a base station, may cause the one or more processors to receive, from a UE, an indication of a range of frequencies outside an operational bandwidth of the UE that are compatible with one or more beam weights associated with the operational bandwidth of the UE; and communicate, with the UE, based at least in part on receiving the indication of the range of frequencies outside the operational bandwidth of the UE.

In some aspects, an apparatus for wireless communication may include means for transmitting, to a base station, an indication of a range of frequencies outside an operational bandwidth of the apparatus based at least in part on the range of frequencies being compatible with one or more sets of analog beamforming beam weights associated with the operational bandwidth; and means for communicating, with the base station, based at least in part on transmitting the indication of the range of frequencies outside of the operational bandwidth of the apparatus.

In some aspects, an apparatus for wireless communication may include means for receiving, from a UE, an indication of a range of frequencies outside an operational bandwidth of the UE that are compatible with one or more beam weights associated with the operational bandwidth of the UE; and means for communicating, with the UE, based at least in part on receiving the indication of the range of frequencies outside the operational bandwidth of the UE.

In some aspects, a method of wireless communication, performed by a UE, may include determining a range of frequencies outside of an operational bandwidth for beamforming by the UE, wherein the beamforming comprises a hybrid beamforming, based at least in part on a determination that the range of frequencies are compatible with one or more sets of beamforming parameters associated with the operational bandwidth; and transmitting, to a base station, an indication of the range of frequencies outside the operational bandwidth for beamforming by the UE.

In some aspects, a method of wireless communication, performed by a base station, may include receiving, from a UE, an indication of a range of frequencies outside an operational bandwidth for beamforming by the UE, wherein the beamforming comprises a hybrid beamforming; and determining that the range of frequencies are compatible with one or more beamforming parameters associated with the operational bandwidth of the UE based at least in part on the indication of the range of frequencies outside the operational bandwidth of the UE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
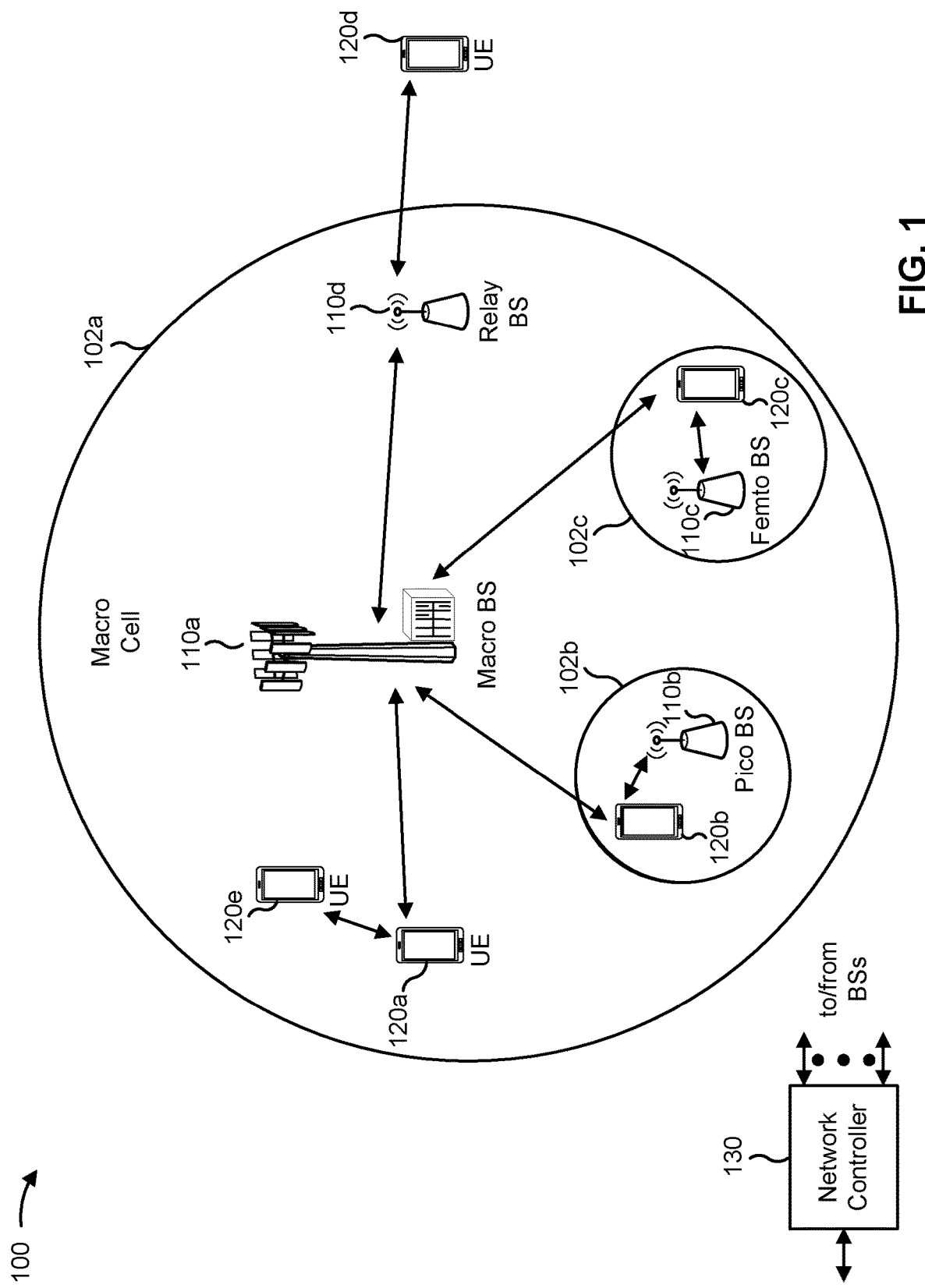
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
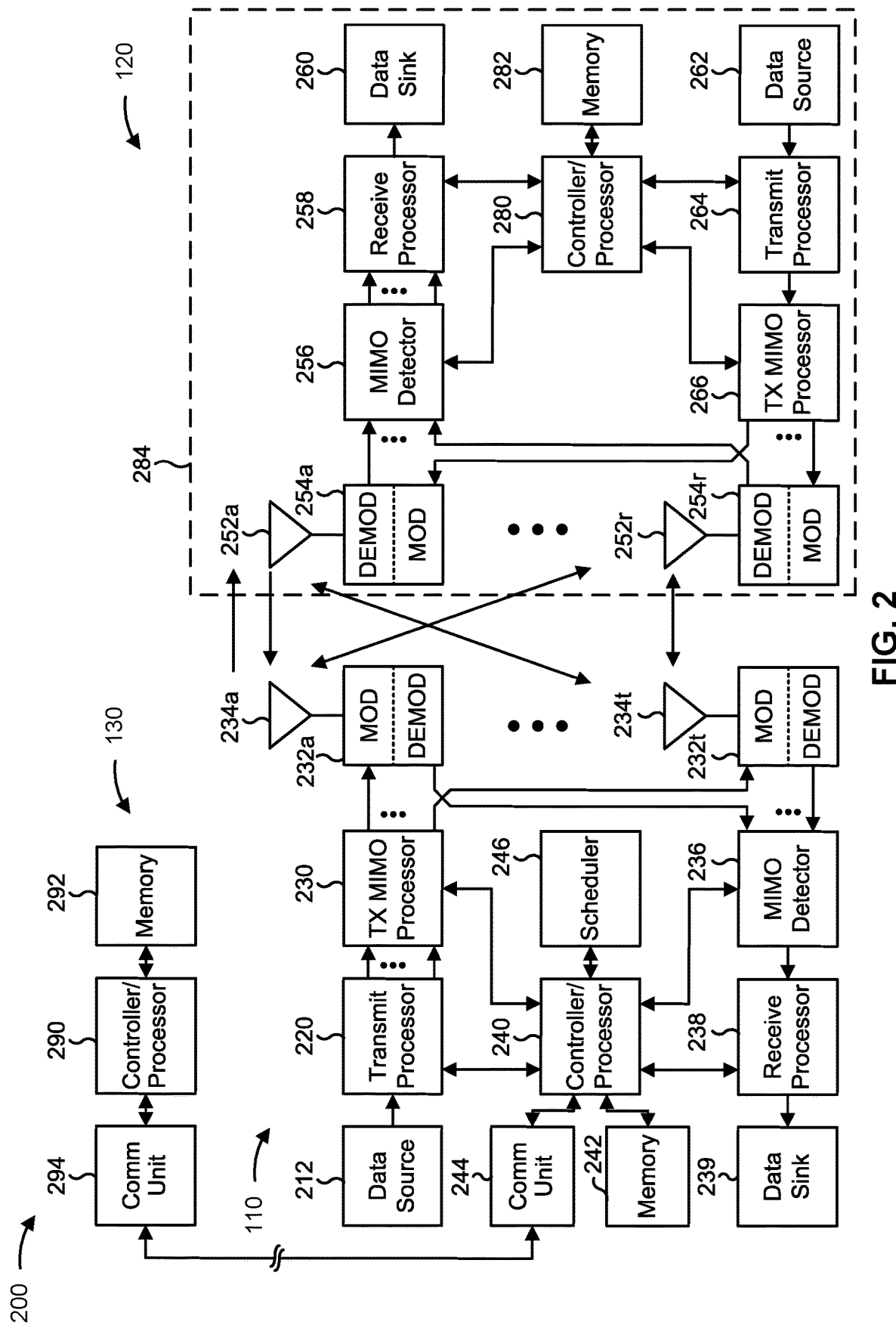
FIG. 2 is a diagram illustrating an example of abase station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4A, 4B, 5 and 6).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4A, 4B, 5 and 6).

Controller/processor 240 of base station 110, controller/processor 280 of UE 120, and/or any other component(s) of FIG. 2 may perform one or more techniques associated with reporting wide bandwidth operation for analog beamforming, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some aspects, executing instructions may include running the instructions, converting the instructions, compiling the instructions, and/or interpreting the instructions, among other examples.

In some aspects, UE 120 may include means for transmitting, to a base station, an indication of a range of frequencies outside an operational bandwidth of the UE based at least in part on the range of frequencies being compatible with one or more sets of analog beamforming beam weights associated with the operational bandwidth, and/or means for communicating, with the base station, based at least in part on transmitting the indication of the range of frequencies outside of the operational bandwidth of the UE, among other examples. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for receiving, from a UE, an indication of a range of frequencies outside an operational bandwidth of the UE that are compatible with one or more beam weights associated with the operational bandwidth of the UE, and/or means for communicating, with the UE, based at least in part on receiving the indication of the range of frequencies outside the operational bandwidth of the UE, among other examples. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
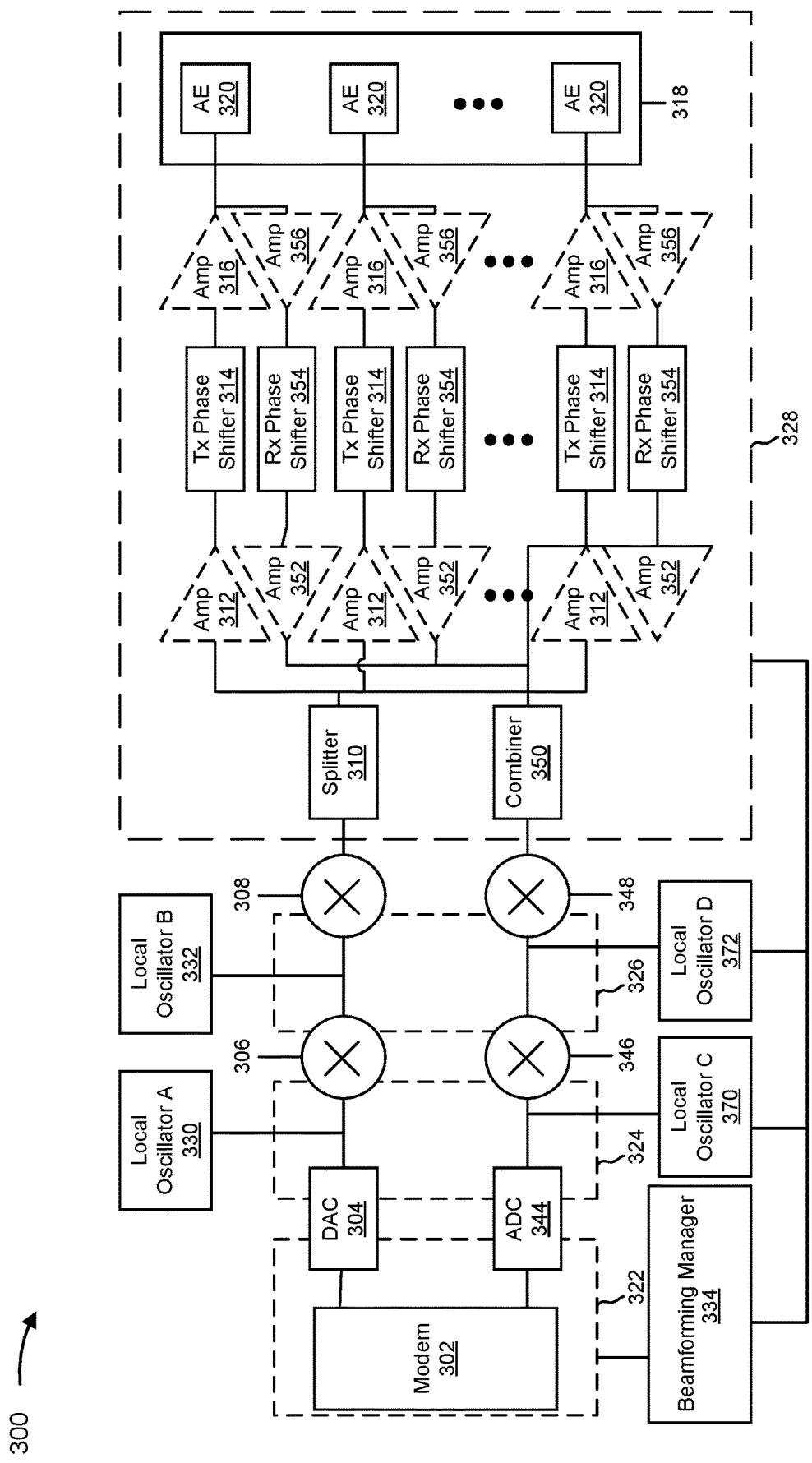
FIG. 3 is a diagram illustrating an example beamforming architecture that supports determining sub-dominant clusters in a millimeter wave (mmW) channel, in accordance with the present disclosure.

FIG. 3 is a diagram illustrating an example beamforming architecture 300 that supports determining sub-dominant clusters in a millimeter wave (mmW) channel, in accordance with the present disclosure. In some aspects, architecture 300 may implement aspects of wireless network 100. In some aspects, architecture 300 may be implemented in a transmitting device (e.g., a first wireless communication device, UE, or base station) and/or a receiving device (e.g., a second wireless communication device, UE, or base station), as described herein.

Broadly, FIG. 3 is a diagram illustrating example hardware components of a wireless communication device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 300 includes a modem (modulator/demodulator) 302, a digital to analog converter (DAC) 304, a first mixer 306, a second mixer 308, and a splitter 310. The architecture 300 also includes multiple first amplifiers 312, multiple phase shifters 314, multiple second amplifiers 316, and an antenna array 318 that includes multiple antenna elements 320.

Transmission lines or other waveguides, wires, traces, and/or the like are shown connecting the various components to illustrate how signals to be transmitted may travel between components. Reference numbers 322, 324, 326, and 328 indicate regions in the architecture 300 in which different types of signals travel or are processed. Specifically, reference number 322 indicates a region in which digital baseband signals travel or are processed, reference number 324 indicates a region in which analog baseband signals travel or are processed, reference number 326 indicates a region in which analog intermediate frequency (IF) signals travel or are processed, and reference number 328 indicates a region in which analog radio frequency (RF) signals travel or are processed. The architecture also includes a local oscillator A 330, a local oscillator B 332, and a beamforming manager 334 (e.g., a controller, a processor, and/or the like).

Each of the antenna elements 320 may include one or more sub-elements for radiating or receiving RF signals. For example, a single antenna element 320 may include a first sub-element cross-polarized with a second sub-element that can be used to independently transmit cross-polarized signals. The antenna elements 320 may include patch antennas, dipole antennas, or other types of antennas arranged in a linear pattern, a two-dimensional pattern, or another pattern. A spacing between antenna elements 320 may be such that signals with a desired wavelength transmitted separately by the antenna elements 320 may interact or interfere (e.g., to form a desired beam). For example, given an expected range of wavelengths or frequencies, the spacing may provide a quarter wavelength, half wavelength, or other fraction of a wavelength of spacing between neighboring antenna elements 320 to allow for interaction or interference of signals transmitted by the separate antenna elements 320 within that expected range.

The modem 302 processes and generates digital baseband signals and may also control operation of the DAC 304, first and second mixers 306, 308, splitter 310, first amplifiers 312, phase shifters 314, and/or the second amplifiers 316 to transmit signals via one or more or all of the antenna elements 320. The modem 302 may process signals and control operation in accordance with a communication standard such as a wireless standard discussed herein. The DAC 304 may convert digital baseband signals received from the modem 302 (and that are to be transmitted) into analog baseband signals. The first mixer 306 upconverts analog baseband signals to analog IF signals within an IF using a local oscillator A 330. For example, the first mixer 306 may mix the signals with an oscillating signal generated by the local oscillator A 330 to "move" the baseband analog signals to the IF. In some cases, some processing or filtering (not shown) may take place at the IF. The second mixer 308 upconverts the analog IF signals to analog RF signals using the local oscillator B 332. Similar to the first mixer, the second mixer 308 may mix the signals with an oscillating signal generated by the local oscillator B 332 to "move" the IF analog signals to the RF or the frequency at which signals will be transmitted or received. The modem 302 and/or the beamforming manager 334 may adjust the frequency of local oscillator A 330 and/or the local oscillator B 332 so that a desired IF and/or RF frequency is produced and used to facilitate processing and transmission of a signal within a desired bandwidth.

In the illustrated architecture 300, signals upconverted by the second mixer 308 are split or duplicated into multiple signals by the splitter 310. The splitter 310 in architecture 300 splits the RF signal into multiple identical or nearly identical RF signals. In other examples, the split may take place with any type of signal, including with baseband digital, baseband analog, or IF analog signals. Each of these signals may correspond to an antenna element 320, and the signal travels through and is processed by amplifiers 312, 316, phase shifters 314, and/or other elements corresponding to the respective antenna element 320 to be provided to and transmitted by the corresponding antenna element 320 of the antenna array 318. In one example, the splitter 310 may be an active splitter that is connected to a power supply and provides some gain so that RF signals exiting the splitter 310 are at a power level equal to or greater than the signal entering the splitter 310. In another example, the splitter 310 is a passive splitter that is not connected to a power supply, and the RF signals exiting the splitter 310 may be at a power level lower than the RF signal entering the splitter 310.

After being split by the splitter 310, the resulting RF signals may enter an amplifier, such as a first amplifier 312, or a phase shifter 314 corresponding to an antenna element 320. The first and second amplifiers 312, 316 are illustrated with dashed lines because one or both of them might not be necessary in some aspects. In some aspects, both the first amplifier 312 and second amplifier 316 are present. In some aspects, neither the first amplifier 312 nor the second amplifier 316 is present. In some aspects, one of the two amplifiers 312, 316 is present but not the other. By way of example, if the splitter 310 is an active splitter, the first amplifier 312 may not be used. By way of further example, if the phase shifter 314 is an active phase shifter that can provide a gain, the second amplifier 316 might not be used.

The amplifiers 312, 316 may provide a desired level of positive or negative gain. A positive gain (positive dB) may be used to increase an amplitude of a signal for radiation by a specific antenna element 320. A negative gain (negative dB) may be used to decrease an amplitude and/or suppress radiation of the signal by a specific antenna element. Each of the amplifiers 312, 316 may be controlled independently (e.g., by the modem 302 or the beamforming manager 334) to provide independent control of the gain for each antenna element 320. For example, the modem 302 and/or the beamforming manager 334 may have at least one control line connected to each of the splitter 310, first amplifiers 312, phase shifters 314, and/or second amplifiers 316 that may be used to configure a gain to provide a desired amount of gain for each component and thus each antenna element 320.

The phase shifter 314 may provide a configurable phase shift or phase offset to a corresponding RF signal to be transmitted. The phase shifter 314 may be a passive phase shifter not directly connected to a power supply. Passive phase shifters might introduce some insertion loss. The second amplifier 316 may boost the signal to compensate for the insertion loss. The phase shifter 314 may be an active phase shifter connected to a power supply such that the active phase shifter provides some amount of gain or prevents insertion loss. The settings of each of the phase shifters 314 are independent, meaning that each can be set to provide a desired amount of phase shift or the same amount of phase shift or some other configuration. The modem 302 and/or the beamforming manager 334 may have at least one control line connected to each of the phase shifters 314 and which may be used to configure the phase shifters 314 to provide desired amounts of phase shift or phase offset between antenna elements 320.

In the illustrated architecture 300, RF signals received by the antenna elements 320 are provided to one or more of first amplifiers 356 to boost the signal strength. The first amplifiers 356 may be connected to the same antenna arrays 318 (e.g., for time division duplex (TDD) operations). The first amplifiers 356 may be connected to different antenna arrays 318. The boosted RF signal is input into one or more of phase shifters 354 to provide a configurable phase shift or phase offset for the corresponding received RF signal. The phase shifter 354 may be an active phase shifter or a passive phase shifter. The settings of the phase shifters 354 are independent, meaning that each can be set to provide a desired amount of phase shift or the same amount of phase shift or some other configuration. The modem 302 and/or the beamforming manager 334 may have at least one control line connected to each of the phase shifters 354 and which may be used to configure the phase shifters 354 to provide a desired amount of phase shift or phase offset between antenna elements 320.

The outputs of the phase shifters 354 may be input to one or more second amplifiers 352 for signal amplification of the phase shifted received RF signals. The second amplifiers 352 may be individually configured to provide a configured amount of gain. The second amplifiers 352 may be individually configured to provide an amount of gain to ensure that the signals input to combiner 350 have the same magnitude. The amplifiers 352 and/or 356 are illustrated in dashed lines because they might not be necessary in some aspects. In some aspects, both the amplifier 352 and the amplifier 356 are present. In another aspect, neither the amplifier 352 nor the amplifier 356 are present. In other aspects, one of the amplifiers 352, 356 is present but not the other.

In the illustrated architecture 300, signals output by the phase shifters 354 (via the amplifiers 352 when present) are combined in combiner 350. The combiner 350 in architecture 300 combines the RF signal into a signal. The combiner 350 may be a passive combiner (e.g., not connected to a power source), which may result in some insertion loss. The combiner 350 may be an active combiner (e.g., connected to a power source), which may result in some signal gain. When combiner 350 is an active combiner, it may provide a different (e.g., configurable) amount of gain for each input signal so that the input signals have the same magnitude when they are combined. When combiner 350 is an active combiner, the combiner 350 may not need the second amplifier 352 because the active combiner may provide the signal amplification.

The output of the combiner 350 is input into mixers 348 and 346. Mixers 348 and 346 generally down convert the received RF signal using inputs from local oscillators 372 and 370, respectively, to create intermediate or baseband signals that carry the encoded and modulated information. The output of the mixers 348 and 346 are input into an analog-to-digital converter (ADC) 344 for conversion to analog signals. The analog signals output from ADC 344 is input to modem 302 for baseband processing, such as decoding, de-interleaving, and/or the like.

The architecture 300 is given by way of example only to illustrate an architecture for transmitting and/or receiving signals. In some cases, the architecture 300 and/or each portion of the architecture 300 may be repeated multiple times within an architecture to accommodate or provide an arbitrary number of RF chains, antenna elements, and/or antenna panels. Furthermore, numerous alternate architectures are possible and contemplated. For example, although only a single antenna array 318 is shown, two, three, or more antenna arrays may be included, each with one or more of their own corresponding amplifiers, phase shifters, splitters, mixers, DACs, ADCs, and/or modems. For example, a single UE may include two, four, or more antenna arrays for transmitting or receiving signals at different physical locations on the UE or in different directions.

Furthermore, mixers, splitters, amplifiers, phase shifters and other components may be located in different signal type areas (e.g., represented by different ones of the reference numbers 322, 324, 326, 328) in different implemented architectures. For example, a split of the signal to be transmitted into multiple signals may take place at the analog RF, analog IF, analog baseband, or digital baseband frequencies in different examples. Similarly, amplification and/or phase shifts may also take place at different frequencies. For example, in some aspects, one or more of the splitter 310, amplifiers 312, 316, or phase shifters 314 may be located between the DAC 304 and the first mixer 306 or between the first mixer 306 and the second mixer 308. In one example, the functions of one or more of the components may be combined into one component. For example, the phase shifters 314 may perform amplification to include or replace the first and/or or second amplifiers 312, 316. By way of another example, a phase shift may be implemented by the second mixer 308 to obviate the need for a separate phase shifter 314. This technique is sometimes called local oscillator (LO) phase shifting. In some aspects of this configuration, there may be multiple IF to RF mixers (e.g., for each antenna element chain) within the second mixer 308, and the local oscillator B 332 may supply different local oscillator signals (with different phase offsets) to each IF to RF mixer.

The modem 302 and/or the beamforming manager 334 may control one or more of the other components 304 through 372 to select one or more antenna elements 320 and/or to form beams for transmission of one or more signals. For example, the antenna elements 320 may be individually selected or deselected for transmission of a signal (or signals) by controlling an amplitude of one or more corresponding amplifiers, such as the first amplifiers 312 and/or the second amplifiers 316. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element 320, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 318) can be dynamically controlled by modifying the phase shifts or phase offsets imparted by the phase shifters 314 and amplitudes imparted by the amplifiers 312, 316 of the multiple signals relative to each other. The beamforming manager 334 may be located partially or fully within one or more other components of the architecture 300. For example, the beamforming manager 334 may be located within the modem 302 in some aspects.

As indicated above, FIG. 3 is provided as an example. Other examples may differ from what is described with regard to FIG. 3.

In some wireless networks, a user equipment (e.g., UE 120) may operate in upper mmW bands, such as in (anticipated) frequency range 4 (FR4) (e.g., from 52.6 GHz to 114.25 GHz). In these bands, the UE 120 may accommodate a wide bandwidth (e.g., a 2 GHz bandwidth and above) and a large antenna array (e.g., a 4×4 antenna array and/or other large size antenna arrays).

The UE 120, operating in the upper mmW bands, may perform analog/RF beamforming over the large antenna array. Analog beamforming may use an analog beamforming codebook that includes one or more sets of analog beamforming beam weights that apply to a range of frequencies (e.g., an operational bandwidth). However, a size of the analog beamforming codebook (e.g., the number of sets of analog beamforming beam weights, and thereby the range of frequencies to which the analog beamforming codebook applies (e.g., the operational bandwidth)) may be limited. For example, the analog beamforming codebook may be stored in a memory of one or more control circuits (e.g., radio-frequency integrated circuits) that control one or more antenna elements of the antenna array of the UE 120. The memory of the one or more control circuits may have a limited analog beamforming codebook storage memory. Additionally, UE 120 actions, such as initial cell acquisition, and/or steady-state beam scanning, among other examples, may impose further power, thermal, and/or latency constraints which may require smaller analog beamforming codebooks. As a result, the analog beamforming codebook that the UE 120 is capable of storing (e.g., in the memory of the one or more control circuits) may not be applicable to a bandwidth of the UE 120 when the UE 120 is operating with a wide bandwidth. This may increase latency and reduce reliability of communications as, for communications using a frequency outside of the operational bandwidth of the analog beamforming codebook populated (e.g., loaded and/or the like) in the memory of the one or more control circuits, the UE 120 may need to determine a different analog beamforming codebook and populate the different analog beamforming codebook in the memory of the one or more control circuits. For example, this may increase latency increases as RF integrated circuit (RFIC) memory may be small and analog beamforming codebooks need to be stored in slower memory/random-access memory (RAM).

Some techniques and apparatuses described herein enable the UE 120 to report a beam coherence bandwidth (e.g., a range of frequencies outside of the operational bandwidth associated with the analog beamforming codebook currently populated in the memory of the one or more control circuits to which the analog beamforming codebook is compatible) to a base station. The "beam coherence bandwidth" may also be called by other phrases in standardization efforts (e.g., a 3GPP standard). For example, there may be a range of frequencies outside of the operational bandwidth over which the analog beamforming codebook is compatible (e.g., the one or more sets of analog beamforming beam weights included in the analog beamforming codebook may be applied to signals in the range of frequencies outside of the operational bandwidth without significant array gain degradation). As described herein, "compatibility" may be defined with respect to the re-use of the same analog beamforming beam codebook over a larger bandwidth without having to re-load/re-populate a different analog beamforming beam codebook for improved performance as the carrier frequency changes. The UE 120 may perform analog beamforming using the analog beamforming codebook currently populated in the memory of the one or more control circuits over the beam coherence bandwidth (e.g., the operational bandwidth of the analog beamforming codebook and the range of frequencies outside of the operational bandwidth). This may reduce latency and increase reliability of communication as the UE 120 may perform analog beamforming over a wider bandwidth without having to determine a different analog beamforming codebook and populate the different analog beamforming codebook in the memory of the one or more control circuits.

Figure 4A:
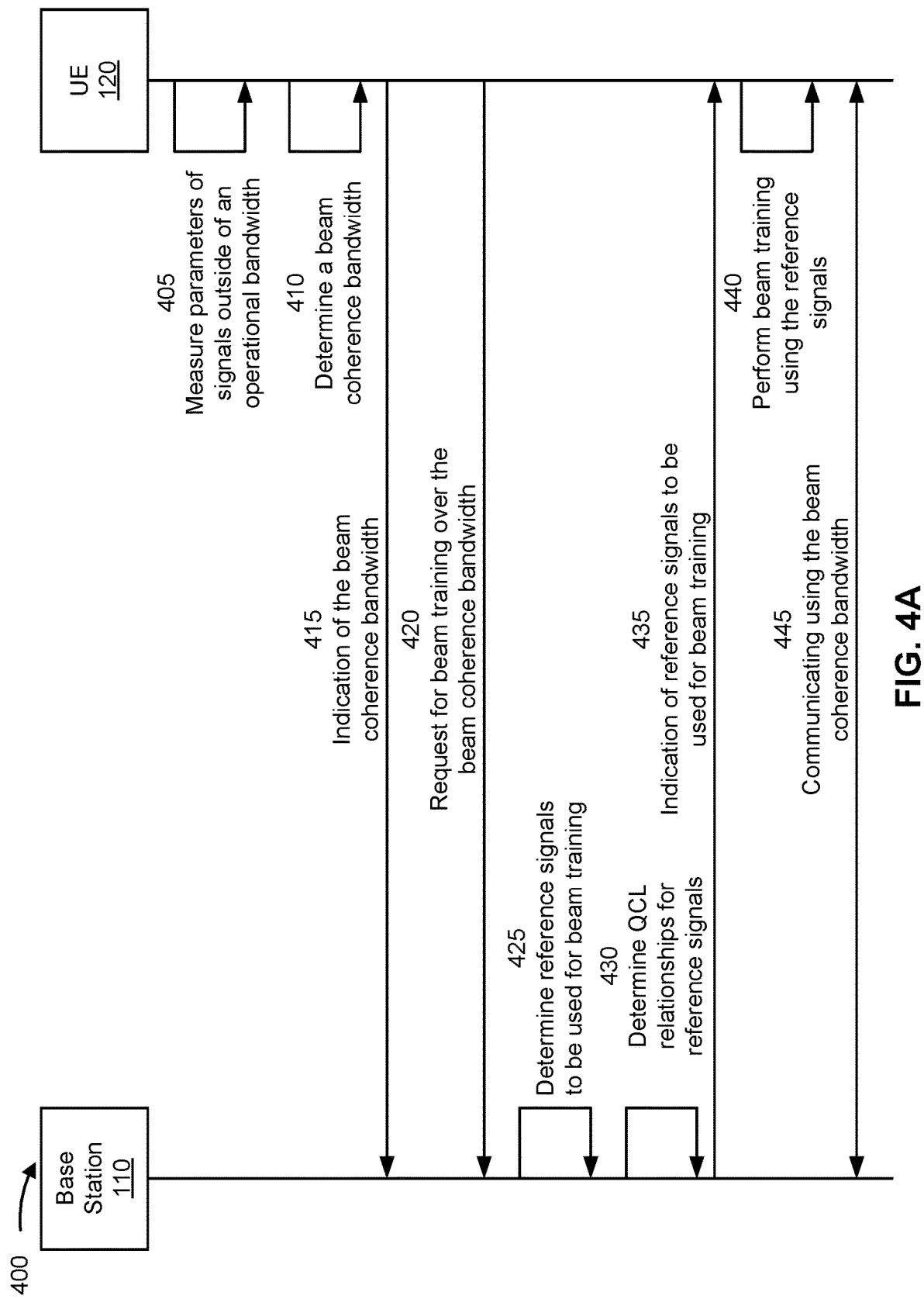
FIGS. 4A and 4B are diagrams illustrating one or more examples of reporting wide bandwidth operation for beamforming, in accordance with the present disclosure.
Figure 4B:
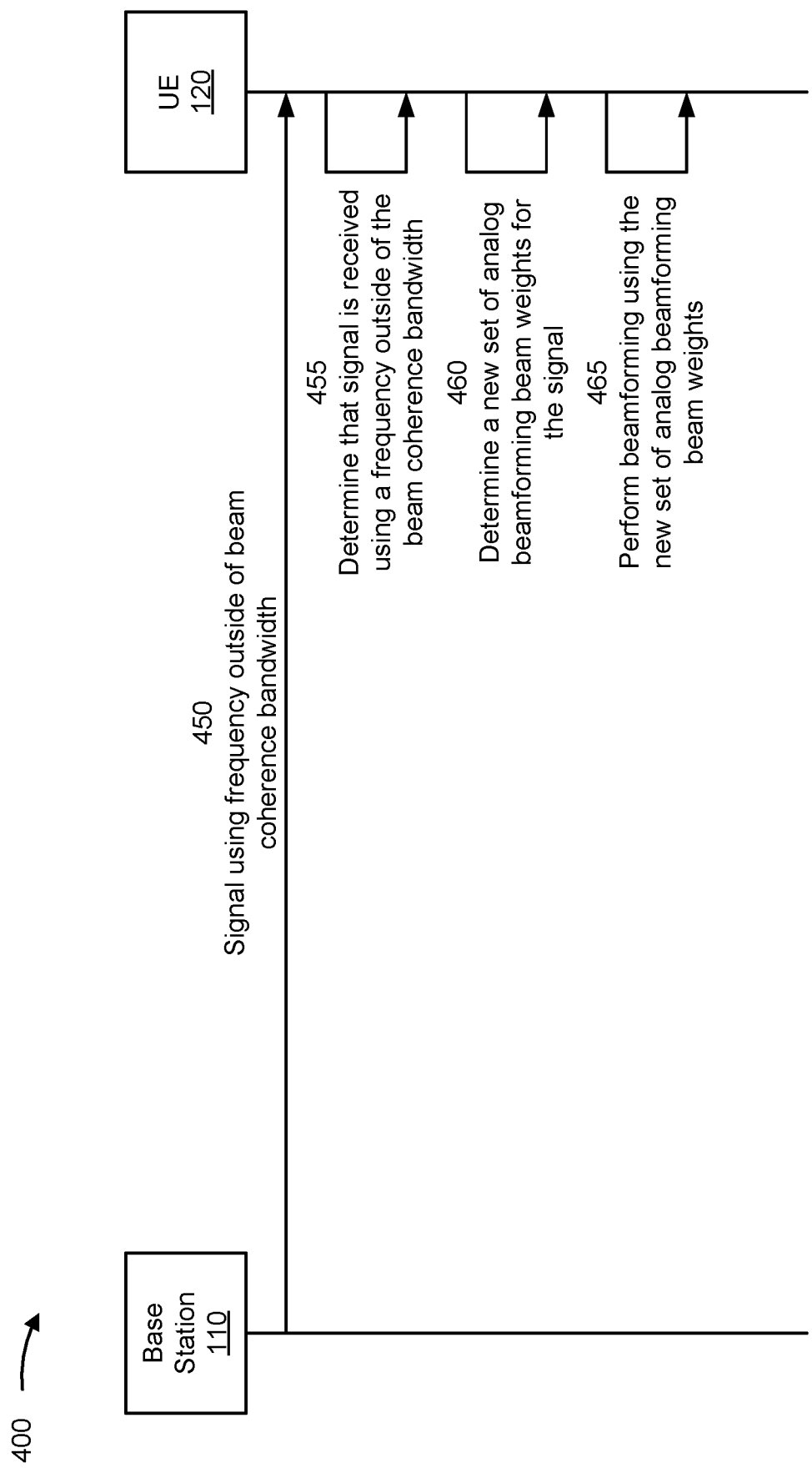

FIGS. 4A and 4B are diagrams illustrating one or more examples 400 of reporting wide bandwidth operation for beamforming, in accordance with the present disclosure. As shown in FIGS. 4A and 4B, a base station 110 and a UE 120 may communicate with one another in a wireless network (e.g., wireless network 100). As explained above, the UE 120 may operate using a wide bandwidth (e.g., 2 GHz and above) and use a large antenna array (e.g., a 4×4 antenna array, an antenna array including 16 antenna elements, and/or other another large size antenna array).

The UE 120 may perform analog beamforming over the antenna array of the UE 120 using an analog beamforming codebook containing one or more sets of analog beamforming beam weights. The one or more sets of analog beamforming beam weights may include a phase shifter parameter (e.g., indicating a phase shift or phase offset to a corresponding RF signal), and/or an amplitude control parameter (e.g., indicating a level of positive or negative gain), among other examples.

The analog beamforming codebook may be associated with a range of frequencies. The range of frequencies that the analog beamforming codebook is associated with may be an operational bandwidth of the UE 120. The operational bandwidth may be based at least in part on a memory constraint of the UE 120 (e.g., a memory constraint of one or more control circuits of the UE 120), a geographical location of the UE, a deployment associated with the base station or a transmission reception point (TRP), a channel condition, a communication rate parameter (e.g., indicating a transmit rate and/or a receive rate of one or more communications), a communication reliability parameter (e.g., indicating a required reliability and/or error rate of one or more communications), a power constraint (e.g., indicating a maximum or available level of power of the UE 120), a thermal constraint (e.g., indicating a maximum temperature measured by the UE 120), and/or a UE capability constraint reported to the base station or the TRP, among other examples.

In some aspects, the UE 120 may perform digital beamforming, and/or hybrid beamforming, among other examples. Hybrid beamforming may include analog beamforming and digital beamforming and may support multi-beam operation. That is, the UE 120, when performing hybrid beamforming, may perform both analog beamforming and digital beamforming for a received signal. For example, the beamforming architecture (e.g., hardware) of the UE 120 may include analog beamforming elements and/or digital beamforming elements. As a result, aspects described herein with respect to analog beamforming may be applicable to a UE 120 performing analog beamforming, digital beamforming, and/or hybrid beamforming.

In some aspects, the actual bandwidth (e.g., in wide bandwidth operation) of the UE 120 may be different than the operational bandwidth (e.g., the actual bandwidth may be larger than the operational bandwidth). As a result, in some aspects, the UE 120 may use multiple analog beamforming codebooks when performing beamforming over the actual bandwidth of the UE 120. In some aspects, there may be a range of frequencies outside of the operational bandwidth that are compatible with one or more sets of analog beamforming beam weights associated with the operational bandwidth.

As show by reference number 405, the UE 120 may measure parameters of signals received by the UE 120 outside of the operational bandwidth. For example, the UE 120 may receive a signal using a frequency outside of the operational bandwidth. The UE 120 may perform analog beamforming or hybrid beamforming for the signal using the analog beamforming codebook associated with the operational bandwidth. The UE 120 may measure parameters of the signal after performing analog beamforming or hybrid beamforming using the analog beamforming codebook associated with the operational bandwidth. The measured parameters may include an array gain of the signal, and/or a signal-to-noise ratio (SNR) of the signal, among other examples.

As shown by reference number 410, the UE 120 may determine a beam coherence bandwidth (e.g., the operational bandwidth and a range of frequencies outside of the operational bandwidth that are compatible with one or more beamforming parameters (e.g., sets of analog beamforming beam weights included in an analog beamforming codebook associated with the operational bandwidth)). The UE 120 may determine the range of frequencies outside of the operational bandwidth that are compatible with one or more sets of analog beamforming beam weights based at least in part on measuring parameters of signals received by the UE 120 outside of the operational bandwidth. In some aspects, the UE 120 may determine the beam coherence bandwidth based at least in part on a configuration of the UE 120. In some aspects, the UE 120 may determine the beam coherence bandwidth based at least in part on an indication received from the base station 110 and/or another UE within the wireless network 100.

For example, the UE 120 may determine the range of frequencies outside of the operational bandwidth based at least in part on the measured parameters of signals in the range of frequencies outside of the operational bandwidth not experiencing degradation when the UE 120 performs analog beamforming or hybrid beamforming for the signals using the analog beamforming codebook associated with the operational bandwidth. In some aspects, the UE 120 may determine the range of frequencies outside of the operational bandwidth based at least in part on signals received in the range of frequencies outside of the operational bandwidth not experiencing array gain degradation (e.g., based at least in part on a variance in the measured array gain of the signals when compared to signals received in the operational bandwidth satisfying a threshold variance).

In some aspects, the range of frequencies outside of the operational bandwidth that are compatible with one or more sets of analog beamforming beam weights included in an analog beamforming codebook associated with the operational bandwidth may include a range of frequencies lower than the operational bandwidth and/or a range of frequencies higher than the operational bandwidth. For example, if the operational bandwidth is 1 GHz wide (e.g., from 60 GHz to 61 GHz, for example) the UE 120 may determine that the range of frequencies outside of the operational bandwidth includes frequencies 0.5 GHz lower than that operational bandwidth and frequencies 0.25 GHz higher than the operational bandwidth. In that case, the UE 120 may determine that the beam coherence bandwidth is 1.75 GHz wide (e.g., from 59.5 GHz to 61.25 GHz). In some aspects, the UE 120 may determine that the range of frequencies outside of the operational bandwidth includes frequencies 1 GHz higher than the operational bandwidth. In that case, the UE 120 may determine that the beam coherence bandwidth is 2.0 GHz wide (e.g., from 60 GHz to 62 GHz).

As shown by reference number 415, the UE 120 may transmit an indication of the beam coherence bandwidth to the base station 110. The indication of the beam coherence bandwidth may include an indication of the analog beamforming codebook that is associated with the beam coherence bandwidth. In some aspects, the indication may be an indication of the range of frequencies outside of the operational bandwidth determined by the UE 120, as described above.

As shown by reference number 420, the UE 120 may transmit a request for beam training over the beam coherence bandwidth (e.g., over the operational bandwidth and the range of frequencies outside of the operational bandwidth) to the base station 110. In some aspects, the request for beam training over the beam coherence bandwidth may be included in the same transmission as the indication of the beam coherence bandwidth. In some aspects, the request for beam training over the beam coherence bandwidth may be transmitted after the indication of the beam coherence bandwidth. In some aspects, the request for beam training over the beam coherence bandwidth may include a request for beam training over multiple reference signals.

As shown by reference number 425, the base station 110 may determine one or more reference signals to be used for beam training over the beam coherence bandwidth. In some aspects, the base station 110 may determine one or more reference signals to be used for beam training over the actual bandwidth of the UE 120 and may determine one or reference signals to be used over the beam coherence bandwidth. In some aspects, the base station 110 may determine the one or more reference signals to be used for beam training based at least in part on the beam coherence bandwidth, a UE 120 configuration, and/or an antenna array (or subarray) of the UE 120, among other examples. In some aspects, the base station 110 may determine a reference signal density (e.g., a number of resource elements per resource block, a frequency domain density, and/or a time domain density) and/or a quantity of reference signals (e.g., a number of reference signals, a quantitative measure of reference signals, and/or the like) to be used for beam training over the beam coherence bandwidth, among other examples. In some aspects, the one or more reference signals may include one or more sounding reference signals (SRSs) to be used for uplink beam training and/or one or more channel state information reference signals (CSI-RSs) to be used for downlink beam training.

As shown by reference number 430, the base station 110 may determine one or more quasi co-location relationships for the one or more reference signals. In some aspects, the base station 110 may determine a quasi-co-location mapping indicating a set of reference blocks quasi co-located (QCL) with each reference signal of the one or more reference signals. For example, the base station 110 may determine that the beam coherence bandwidth includes a first set of resource blocks and a second set of resource blocks. The base station 110 may determine that a first reference signal, of the one or more reference signals to be used for beam training, is quasi co-located with the first set of resource blocks. The base station 110 may determine that a second reference signal, of the one or more reference signals to be used for beam training, is quasi co-located with the second set of resource blocks. The UE 120 may use each reference signal to evaluate or determine parameters (e.g., channel quality information and/or the like) of physical downlink shared channel (PDSCH) communications received in associated reference blocks based at least in part on the determination that the reference signal is QCL with the associated reference blocks. For example, if the UE 120 receives a PDSCH communication in the first set of reference blocks, the UE 120 may determine that the first reference signal may be used to evaluate or determine parameters of the PDSCH communication.

As shown by reference number 435, the base station 110 may transmit an indication of the one or more reference signals to be used for beam training over the beam coherence bandwidth to the UE 120. In some aspects, the indication of the one or more reference signals to be used for beam training may include an indication of one or more QCL relationships of the one or more reference signals, and/or a QCL mapping, among other examples. The indication of the one or more reference signals to be used for beam training may include an indication of one or more SRSs to be used for uplink beam training and/or an indication of one or more CSI-RSs to be used for downlink beam training. In some aspects, the indication of the one or more reference signals to be used for beam training may include an indication of the reference signal density and/or the quantity of reference signals.

As shown by reference number 440, the UE 120 may perform beam training using the one or more reference signals indicated by the base station 110. For example, the UE 120 may perform beam training to determine one or more suitable beams for the beam coherence bandwidth. The UE 120 may receive one or more CSI-RSs (e.g., indicated by the base station 110) to determine one or more suitable downlink beams for the beam coherence bandwidth. The UE 120 may report beam-specific and/or antenna array or antenna element specific channel quality information to the base station 110 based at least in part on the one or more CSI-RSs. The UE 120 may transmit one or more SRSs (e.g., indicated by the base station 110) to the base station 110 to determine one or more suitable uplink beams for the selected antenna subarray. The base station 110 may evaluate beam-specific and/or antenna array or antenna element specific channel quality information based at least in part on the one or more SRSs.

As shown by reference number 445, the UE 120 and the base station 110 may communicate using the beam coherence bandwidth and one or more beams determined based at least in part on the performed beam training. In some aspects, the UE 120 and the base station 110 may communicate using an operating frequency of a mmW band. In some aspects, the UE 120 and the base station 110 may communicate using an operating frequency corresponding an upper mmW band possibly in FR4 (e.g., from 52.6 GHz to 114.25 GHz).

As shown in FIG. 4B, and by reference number 450, the base station 110 may transmit a signal to the UE 120 using a frequency that is outside of the beam coherence bandwidth. In some aspects, the base station 110 may determine that the signal is to be sent to the UE 120 using a frequency that is outside of the beam coherence bandwidth prior to transmitting the signal to the UE 120.

As shown by reference number 455, the UE 120 may determine that the signal is received using a frequency that is outside of the beam coherence bandwidth. As shown by reference number 460, the UE 120 may determine a new set of analog beamforming beam weights for the signal. For example, the UE 120 may determine that the signal is associated with a different one or more sets of analog beamforming beam weights based at least in part on determining that the signal is received using a frequency that is outside of the beam coherence bandwidth (e.g., using a frequency that is not included in the operational bandwidth or in the range of frequencies outside of the operational bandwidth). In some aspects, the UE 120 may determine that the signal is associated with a different analog beamforming codebook based at least in part on determining that the signal is received using a frequency that is outside of the beam coherence bandwidth.

In some aspects, the UE 120 may determine the different analog beamforming codebook and/or the different one or more sets of analog beamforming beam weights based at least in part on the frequency of the signal used. In some aspects, the different analog beamforming codebook and/or the different one or more sets of analog beamforming beam weights may be indicated by the base station 110. For example, the base station 110 may determine the different analog beamforming codebook and/or the different one or more sets of analog beamforming beam weights based at least in part on determining that the signal is to be sent to the UE 120 using a frequency that is outside of the beam coherence bandwidth.

As shown by reference number 465, the UE 120 may perform beamforming for the signal using the new set of analog beamforming beam weights. For example, the UE 120 may populate the memory of the one or more control circuits of the UE 120 with the different analog beamforming codebook that is associated with the frequency of the signal. The UE 120 may perform beamforming for the signal using the different analog beamforming codebook as described above. In this way, the UE 120 may improve communication reliability by ensuring that signal quality will not be degraded by using analog beamforming beam weights for a signal that will result in a degradation of one or more parameters (e.g., array gain and/or another parameter as described above) associated with the signal.

As indicated above, FIGS. 4A and 4B are provided as one or more examples. Other examples may differ from what is described with respect to FIG. 4.

Figure 5:
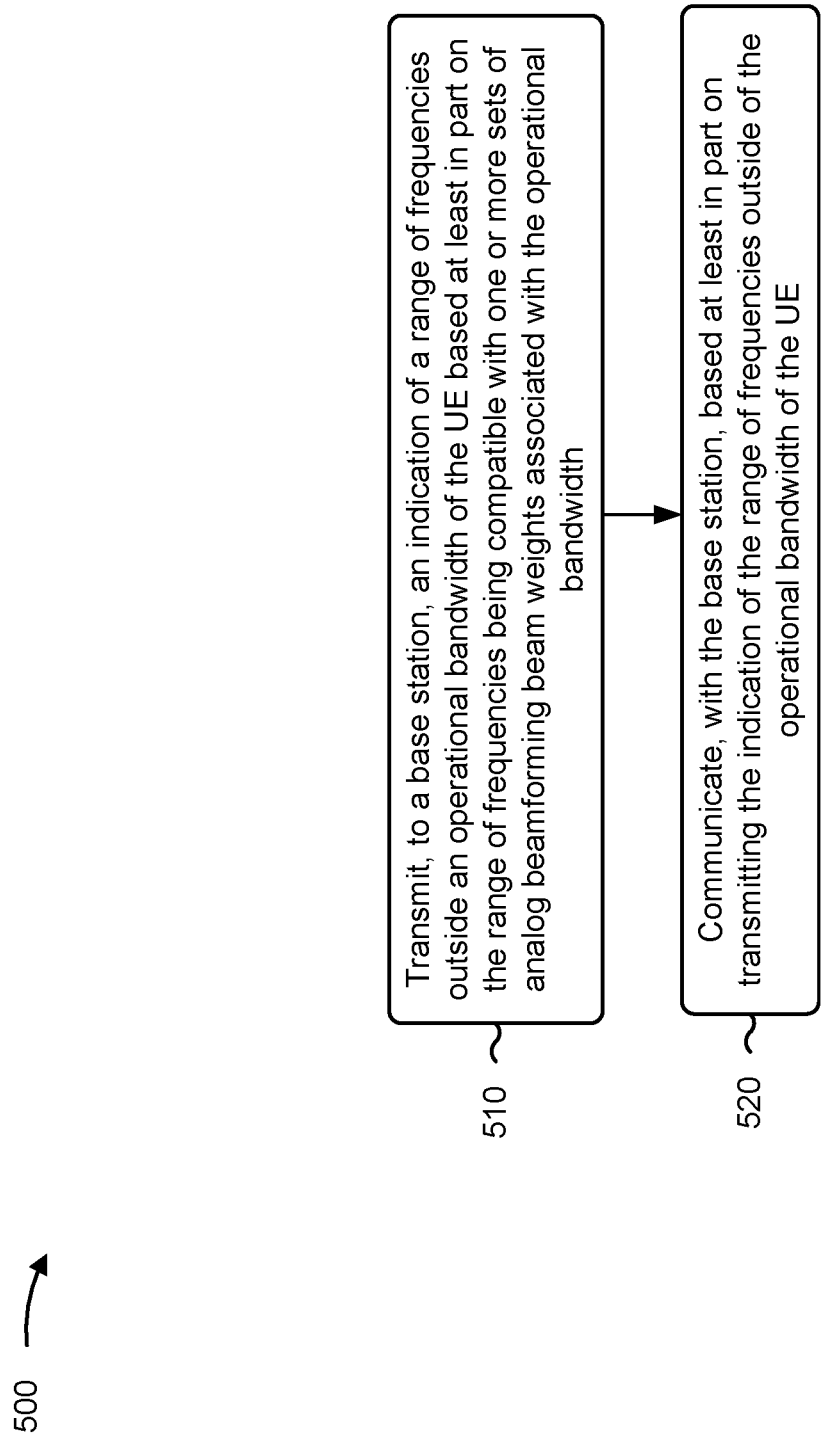
FIG. 5 is a diagram illustrating an example process performed, for example, by a UE, in accordance with the present disclosure.

FIG. 5 is a diagram illustrating an example process 500 performed, for example, by a UE, in accordance with the present disclosure. Example process 500 is an example where the UE (e.g., UE 120) performs operations associated with reporting wide bandwidth operation for analog beamforming.

As further shown in FIG. 5, in some aspects, process 500 may include transmitting, to a base station, an indication of a range of frequencies outside an operational bandwidth of the UE based at least in part on the range of frequencies being compatible with one or more sets of analog beamforming beam weights associated with the operational bandwidth (block 510). For example, the UE (e.g., using receive processor 258, transmit processor 264, controller/processor 280, and/or memory 282,) may transmit, to a base station, an indication of a range of frequencies outside an operational bandwidth of the UE based at least in part on the range of frequencies being compatible with one or more sets of analog beamforming beam weights associated with the operational bandwidth, as described above.

As further shown in FIG. 5, in some aspects, process 500 may include communicating, with the base station, based at least in part on transmitting the indication of the range of frequencies outside of the operational bandwidth of the UE (block 520). For example, the UE (e.g., using receive processor 258, transmit processor 264, controller/processor 280, and/or memory 282,) may communicate, with the base station, based at least in part on transmitting the indication of the range of frequencies outside of the operational bandwidth of the UE, as described above.

Process 500 may include additional aspects, such as any single aspect or any combination of aspects described below and/or in connection with one or more other processes described elsewhere herein.

In a first aspect, the range of frequencies outside of the operational bandwidth of the UE includes at least one of: a range of frequencies lower than the operational bandwidth, a range of frequencies higher than the operational bandwidth, or a combination thereof.

In a second aspect, alone or in combination with the first aspect, the operational bandwidth is based at least in part on at least one of: a geographical location of the UE, a deployment associated with the base station or a transmission reception point (TRP), a channel condition, a communication rate parameter, a communication reliability parameter, a power constraint, a thermal constraint, a UE capability constraint reported to the base station or the TRP, or a combination thereof.

In a third aspect, alone or in combination with one or more of the first and second aspects, process 500 includes measuring an array gain for one or more signals in the range of frequencies outside of the operational bandwidth of the UE using the one or more sets of analog beamforming beam weights associated with the operational bandwidth; and determining that the range of frequencies outside of the operational bandwidth of the UE is compatible with the one or more sets of analog beamforming beam weights associated with the operational bandwidth based at least in part on measuring the array gain for one or more signals in the range of frequencies outside of the operational bandwidth of the UE.

In a fourth aspect, alone or in combination with one or more of the first through third aspects, the one or more sets of analog beamforming beam weights include at least one of: a phase shifter parameter, an amplitude control parameter, or a combination thereof.

In a fifth aspect, alone or in combination with one or more of the first through fourth aspects, process 500 includes transmitting, to the base station, a request for beam training over the operational bandwidth and the range of frequencies outside of the operational bandwidth; and receiving, from the base station, an indication of multiple reference signals to be used for beam training over the operational bandwidth and the range of frequencies outside of the operational bandwidth.

In a sixth aspect, alone or in combination with one or more of the first through fifth aspects, the indication of multiple reference signals to be used for beam training includes an indication that a first reference signal is quasi co-located with a first set of resource blocks and an indication that a second reference signal is quasi co-located with a second set of resource blocks, and the resource blocks of the first set of resource blocks and the second set of resource blocks are within the operational bandwidth or the range of frequencies outside of the operational bandwidth.

In a seventh aspect, alone or in combination with one or more of the first through sixth aspects, process 500 includes determining that a signal is received by the UE using a frequency that is not included in the operational bandwidth or in the range of frequencies outside of the operational bandwidth; and determining that the signal is associated with a different one or more sets of analog beamforming beam weights based at least in part on determining that the signal is received using the frequency that is not included in the operational bandwidth or in the range of frequencies outside of the operational bandwidth.

In an eighth aspect, alone or in combination with one or more of the first through seventh aspects, the one or more sets of analog beamforming beam weights are included in an analog beamforming codebook.

In a ninth aspect, alone or in combination with one or more of the first through eighth aspects, the analog beamforming codebook is populated in a memory of one or more radio-frequency integrated circuits of the UE.

In a tenth aspect, alone or in combination with one or more of the first through ninth aspects, communicating with the base station includes communicating, with the base station, using an operating frequency in a millimeter wave band.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
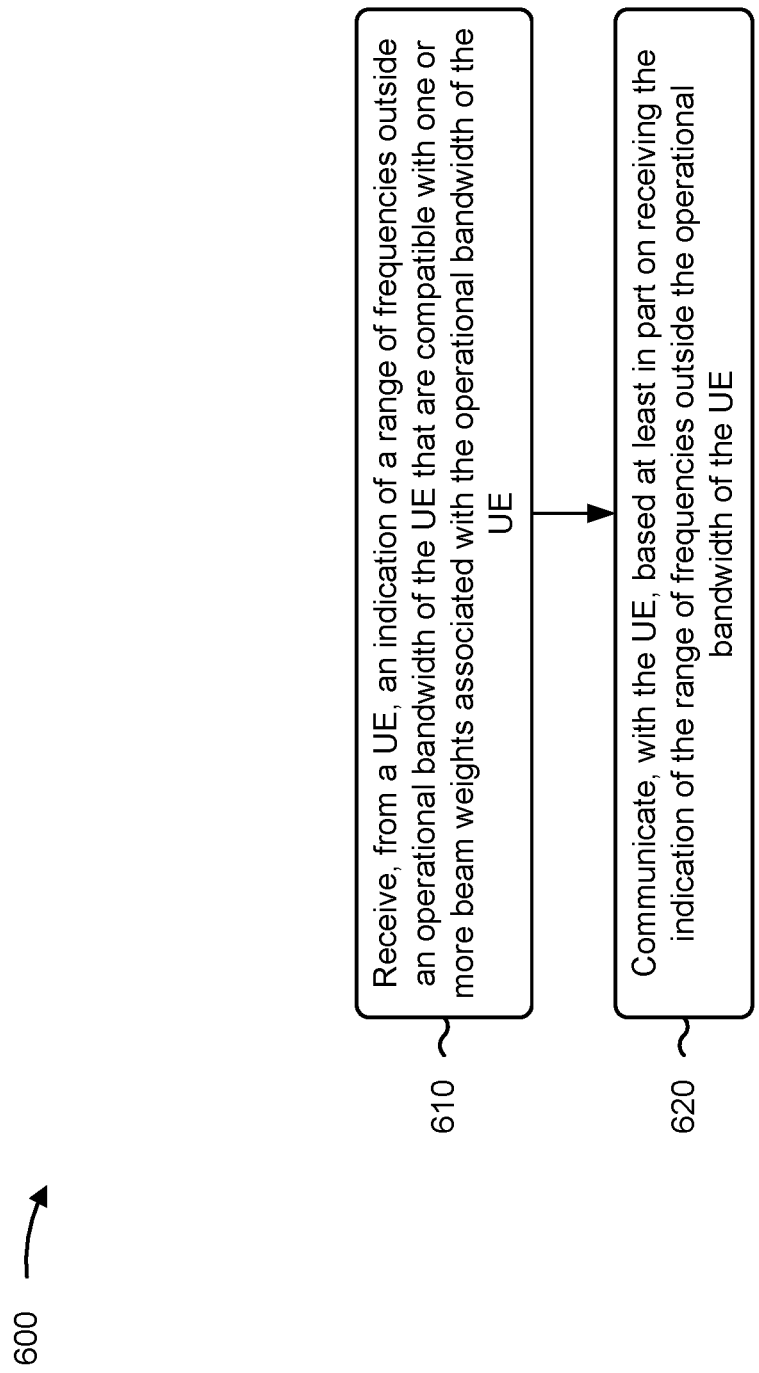
FIG. 6 is a diagram illustrating an example process performed, for example, by a base station, in accordance with the present disclosure.

FIG. 6 is a diagram illustrating an example process 600 performed, for example, by a base station, in accordance with the present disclosure. Example process 600 is an example where the base station (e.g., base station 110) performs operations associated with reporting wide bandwidth operation for analog beamforming.

As shown in FIG. 6, in some aspects, process 600 may include receiving, from a UE, an indication of a range of frequencies outside an operational bandwidth of the UE that are compatible with one or more beam weights associated with the operational bandwidth of the UE (block 610). For example, the base station (e.g., using transmit processor 220, receive processor 238, controller/processor 240, memory 242, and/or the like) may receive, from a UE, an indication of a range of frequencies outside an operational bandwidth of the UE that are compatible with one or more beam weights associated with the operational bandwidth of the UE, as described above.

As further shown in FIG. 6, in some aspects, process 600 may include communicating, with the UE, based at least in part on receiving the indication of the range of frequencies outside the operational bandwidth of the UE (block 620). For example, the base station (e.g., using transmit processor 220, receive processor 238, controller/processor 240, and/or memory 242) may communicate, with the UE, based at least in part on receiving the indication of the range of frequencies outside the operational bandwidth of the UE, as described above.

Process 600 may include additional aspects, such as any single aspect or any combination of aspects described below and/or in connection with one or more other processes described elsewhere herein.

In a first aspect, the range of frequencies outside of the operational bandwidth of the UE includes at least one of: a range of frequencies lower than the operational bandwidth, a range of frequencies higher than the operational bandwidth, or a combination thereof.

In a second aspect, alone or in combination with the first aspect, the operational bandwidth of the UE is based at least in part on at least one of: a geographical location of the UE, a deployment associated with the base station or a TRP, a channel condition, a communication rate parameter, a communication reliability parameter, a power constraint, a thermal constraint, a UE capability constraint reported to the base station or the TRP, or a combination thereof.

In a third aspect, alone or in combination with one or more of the first and second aspects, the one or more beam weights include at least one of: a phase shifter parameter, an amplitude control parameter, or a combination thereof.

In a fourth aspect, alone or in combination with one or more of the first through third aspects, process 600 includes receiving, from the UE, a request for beam training over the operational bandwidth and the range of frequencies outside of the operational bandwidth; and transmitting, to the UE, an indication of multiple reference signals to be used for beam training over the operational bandwidth and the range of frequencies outside of the operational bandwidth.

In a fifth aspect, alone or in combination with one or more of the first through fourth aspects, process 600 includes determining that a first reference signal, of the multiple reference signals to be used for beam training, is quasi co-located with a first set of resource blocks of the operational bandwidth and the range of frequencies outside of the operational bandwidth; and determining that a second reference signal, of the multiple reference signals to be used for beam training, is quasi co-located with a second set of resource blocks of the operational bandwidth and the range of frequencies outside of the operational bandwidth, wherein the resource blocks of the first set of resource blocks and the second set of resource blocks are within the operational bandwidth or the range of frequencies outside of the operational bandwidth, and wherein the indication of multiple reference signals to be used for beam training includes an indication that the first reference signal is quasi co-located with the first set of resource blocks and an indication that the second reference signal is quasi co-located with the second set of resource blocks.

In a sixth aspect, alone or in combination with one or more of the first through fifth aspects, process 600 includes determining that a signal is to be sent to the UE using a frequency that is not included in the operational bandwidth or in the range of frequencies outside of the operational bandwidth; and determining that the signal is associated with a different one or more sets of analog beamforming beam weights based at least in part on determining that the signal is to be sent using the frequency that is not included in the operational bandwidth or in the range of frequencies outside of the operational bandwidth.

In a seventh aspect, alone or in combination with one or more of the first through sixth aspects, the one or more sets of analog beamforming beam weights are included in an analog beamforming codebook.

In an eighth aspect, alone or in combination with one or more of the first through seventh aspects, communicating with the UE includes communicating, with the UE, using an operating frequency in a millimeter wave band.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The following provides an overview of some Aspects of the present disclosure:

Aspect 1: A method of wireless communication performed by a user equipment (UE), comprising: transmitting, to a base station, an indication of a range of frequencies outside an operational bandwidth of the UE based at least in part on the range of frequencies being compatible with one or more sets of analog beamforming beam weights associated with the operational bandwidth; and communicating, with the base station, based at least in part on transmitting the indication of the range of frequencies outside of the operational bandwidth of the UE.

Aspect 2: The method of Aspect 1, wherein the range of frequencies outside of the operational bandwidth of the UE includes at least one of: a range of frequencies lower than the operational bandwidth, a range of frequencies higher than the operational bandwidth, or a combination thereof.

Aspect 3: The method of any of Aspects 1-2, wherein the operational bandwidth is based at least in part on at least one of: a geographical location of the UE, a deployment associated with the base station or a transmission reception point (TRP), a channel condition, a communication rate parameter, a communication reliability parameter, a power constraint, a thermal constraint, a UE capability constraint reported to the base station or the TRP, or a combination thereof.

Aspect 4: The method of any of Aspects 1-3, further comprising: measuring an array gain for one or more signals in the range of frequencies outside of the operational bandwidth of the UE using the one or more sets of analog beamforming beam weights associated with the operational bandwidth; and determining that the range of frequencies outside of the operational bandwidth of the UE is compatible with the one or more sets of analog beamforming beam weights associated with the operational bandwidth based at least in part on measuring the array gain for one or more signals in the range of frequencies outside of the operational bandwidth of the UE.

Aspect 5: The method of any of Aspects 1-4, wherein the one or more sets of analog beamforming beam weights include at least one of: a phase shifter parameter, an amplitude control parameter, or a combination thereof.

Aspect 6: The method of any of Aspects 1-5, further comprising: transmitting, to the base station, a request for beam training over the operational bandwidth and the range of frequencies outside of the operational bandwidth; and receiving, from the base station, an indication of multiple reference signals to be used for beam training over the operational bandwidth and the range of frequencies outside of the operational bandwidth.

Aspect 7: The method of Aspect 6, wherein the indication of multiple reference signals to be used for beam training includes an indication that a first reference signal is quasi co-located with a first set of resource blocks and an indication that a second reference signal is quasi co-located with a second set of resource blocks, wherein the resource blocks of the first set of resource blocks and the second set of resource blocks are within the operational bandwidth or the range of frequencies outside of the operational bandwidth.

Aspect 8: The method of any of Aspects 1-7, further comprising: determining that a signal is received by the UE using a frequency that is not included in the operational bandwidth or in the range of frequencies outside of the operational bandwidth; and determining that the signal is associated with a different one or more sets of analog beamforming beam weights based at least in part on determining that the signal is received using the frequency that is not included in the operational bandwidth or in the range of frequencies outside of the operational bandwidth.

Aspect 9: The method of any of Aspects 1-8, wherein the one or more sets of analog beamforming beam weights are included in an analog beamforming codebook.

Aspect 10: The method of Aspect 9, wherein the analog beamforming codebook is populated in a memory of one or more radio-frequency integrated circuits of the UE.

Aspect 11: The method of any of Aspects 1-10, wherein communicating with the base station comprises: communicating, with the base station, using an operating frequency in a millimeter wave band.

Aspect 12: A method of wireless communication performed by abase station, comprising: receiving, from a user equipment (UE), an indication of a range of frequencies outside an operational bandwidth of the UE that are compatible with one or more beam weights associated with the operational bandwidth of the UE; and communicating, with the UE, based at least in part on receiving the indication of the range of frequencies outside the operational bandwidth of the UE.

Aspect 13: The method of Aspect 12, wherein the range of frequencies outside of the operational bandwidth of the UE includes at least one of: a range of frequencies lower than the operational bandwidth, a range of frequencies higher than the operational bandwidth, or a combination thereof.

Aspect 14: The method of any of Aspects 12-13, wherein the operational bandwidth of the UE is based at least in part on at least one of: a geographical location of the UE, a deployment associated with the base station or a transmission reception point (TRP), a channel condition, a communication rate parameter, a communication reliability parameter, a power constraint, a thermal constraint, a UE capability constraint reported to the base station or the TRP, or a combination thereof.

Aspect 15: The method of any of Aspects 12-14, wherein the one or more beam weights include at least one of: a phase shifter parameter, an amplitude control parameter, or a combination thereof.

Aspect 16: The method of any of Aspects 12-15, further comprising: receiving, from the UE, a request for beam training over the operational bandwidth and the range of frequencies outside of the operational bandwidth; and transmitting, to the UE, an indication of multiple reference signals to be used for beam training over the operational bandwidth and the range of frequencies outside of the operational bandwidth.

Aspect 17: The method of Aspect 16, further comprising: determining that a first reference signal, of the multiple reference signals to be used for beam training, is quasi co-located with a first set of resource blocks of the operational bandwidth and the range of frequencies outside of the operational bandwidth; and determining that a second reference signal, of the multiple reference signals to be used for beam training, is quasi co-located with a second set of resource blocks of the operational bandwidth and the range of frequencies outside of the operational bandwidth, wherein the resource blocks of the first set of resource blocks and the second set of resource blocks are within the operational bandwidth or the range of frequencies outside of the operational bandwidth, and wherein the indication of multiple reference signals to be used for beam training includes an indication that the first reference signal is quasi co-located with the first set of resource blocks and an indication that the second reference signal is quasi co-located with the second set of resource blocks.

Aspect 18: The method of any of Aspects 12-17, further comprising: determining that a signal is to be sent to the UE using a frequency that is not included in the operational bandwidth or in the range of frequencies outside of the operational bandwidth; and determining that the signal is associated with a different one or more sets of analog beamforming beam weights based at least in part on determining that the signal is to be sent using the frequency that is not included in the operational bandwidth or in the range of frequencies outside of the operational bandwidth.

Aspect 19: The method of any of Aspects 12-18, wherein the one or more sets of analog beamforming beam weights are included in an analog beamforming codebook.

Aspect 20: The method of any of Aspects 12-19, wherein communicating with the UE comprises: communicating, with the UE, using an operating frequency in a millimeter wave band.

Aspect 21: An apparatus for wireless communication at a device, comprising a processor; memory coupled with the processor; and instructions stored in the memory and executable by the processor to cause the apparatus to perform the method of one or more of Aspects 1-11.

Aspect 22: A device for wireless communication, comprising a memory and one or more processors coupled to the memory, the memory and the one or more processors configured to perform the method of one or more of Aspects 1-11.

Aspect 23: An apparatus for wireless communication, comprising at least one means for performing the method of one or more of Aspects 1-11.

Aspect 24: A non-transitory computer-readable medium storing code for wireless communication, the code comprising instructions executable by a processor to perform the method of one or more of Aspects 1-11.

Aspect 25: A non-transitory computer-readable medium storing a set of instructions for wireless communication, the set of instructions comprising one or more instructions that, when executed by one or more processors of a device, cause the device to perform the method of one or more of Aspects 1-11.

Aspect 26: An apparatus for wireless communication at a device, comprising a processor; memory coupled with the processor; and instructions stored in the memory and executable by the processor to cause the apparatus to perform the method of one or more of Aspects 12-20.

Aspect 27: A device for wireless communication, comprising a memory and one or more processors coupled to the memory, the memory and the one or more processors configured to perform the method of one or more of Aspects 12-20.

Aspect 28: An apparatus for wireless communication, comprising at least one means for performing the method of one or more of Aspects 12-20.

Aspect 29: A non-transitory computer-readable medium storing code for wireless communication, the code comprising instructions executable by a processor to perform the method of one or more of Aspects 12-20.

Aspect 30: A non-transitory computer-readable medium storing a set of instructions for wireless communication, the set of instructions comprising one or more instructions that, when executed by one or more processors of a device, cause the device to perform the method of one or more of Aspects 12-20.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    transmitting, to a base station, an indication of a range of frequencies outside an operational bandwidth of the UE based at least in part on the range of frequencies being compatible with one or more sets of analog beamforming beam weights associated with the operational bandwidth; and
    communicating, with the base station, based at least in part on transmitting the indication of the range of frequencies outside of the operational bandwidth of the UE.

2. The method of claim 1, wherein the range of frequencies outside of the operational bandwidth of the UE includes at least one of:
    a range of frequencies lower than the operational bandwidth,
    a range of frequencies higher than the operational bandwidth, or
    a combination thereof.

3. The method of claim 1, wherein the operational bandwidth is based at least in part on at least one of:
    a geographical location of the UE,
    a deployment associated with the base station or a transmission reception point (TRP),
    a channel condition,
    a communication rate parameter,
    a communication reliability parameter,
    a power constraint,
    a thermal constraint,
    a UE capability constraint reported to the base station or the TRP, or
    a combination thereof.

4. The method of claim 1, further comprising:
    measuring an array gain for one or more signals in the range of frequencies outside of the operational bandwidth of the UE using the one or more sets of analog beamforming beam weights associated with the operational bandwidth; and
    determining that the range of frequencies outside of the operational bandwidth of the UE is compatible with the one or more sets of analog beamforming beam weights associated with the operational bandwidth based at least in part on measuring the array gain for the one or more signals in the range of frequencies outside of the operational bandwidth of the UE.

5. The method of claim 1, wherein the one or more sets of analog beamforming beam weights include at least one of:
    a phase shifter parameter,
    an amplitude control parameter, or
    a combination thereof.

6. The method of claim 1, further comprising:
    transmitting, to the base station, a request for beam training over the operational bandwidth and the range of frequencies outside of the operational bandwidth; and
    receiving, from the base station, an indication of multiple reference signals to be used for beam training over the operational bandwidth and the range of frequencies outside of the operational bandwidth.

7. The method of claim 6, wherein the indication of multiple reference signals to be used for beam training includes an indication that a first reference signal is quasi co-located with a first set of resource blocks and an indication that a second reference signal is quasi co-located with a second set of resource blocks, wherein the resource blocks of the first set of resource blocks and the second set of resource blocks are within the operational bandwidth or the range of frequencies outside of the operational bandwidth.

8. The method of claim 1, further comprising:
    determining that a signal is received by the UE using a frequency that is not included in the operational bandwidth or in the range of frequencies outside of the operational bandwidth; and determining that the signal is associated with a different one or more sets of analog beamforming beam weights based at least in part on determining that the signal is received using the frequency that is not included in the operational bandwidth or in the range of frequencies outside of the operational bandwidth.

9. The method of claim 1, wherein the one or more sets of analog beamforming beam weights are included in an analog beamforming codebook.

10. The method of claim 9, wherein the analog beamforming codebook is populated in a memory of one or more radio-frequency integrated circuits of the UE.

11. The method of claim 1, wherein communicating with the base station comprises:
communicating, with the base station, using an operating frequency in a millimeter wave band.

12. A user equipment (UE) for wireless communication, comprising:
a memory; and
one or more processors, coupled to the memory, configured to:
transmit, to a base station, an indication of a range of frequencies outside an operational bandwidth of the UE based at least in part on the range of frequencies being compatible with one or more sets of analog beamforming beam weights associated with the operational bandwidth; and
communicate, with the base station, based at least in part on transmitting the indication of the range of frequencies outside of the operational bandwidth of the UE.

13. The UE of claim 12, wherein the range of frequencies outside of the operational bandwidth of the UE includes at least one of:
a range of frequencies lower than the operational bandwidth,
a range of frequencies higher than the operational bandwidth, or
a combination thereof.

14. The UE of claim 12, wherein the operational bandwidth is based at least in part on at least one of:
a geographical location of the UE,
a deployment associated with the base station or a transmission reception point (TRP),
a channel condition,
a communication rate parameter,
a communication reliability parameter,
a power constraint,
a thermal constraint,
a UE capability constraint reported to the base station or the TRP, or
a combination thereof.

15. The UE of claim 12, wherein the one or more processors are further configured to:
measure an array gain for one or more signals in the range of frequencies outside of the operational bandwidth of the UE using the one or more sets of analog beamforming beam weights associated with the operational bandwidth; and
determine that the range of frequencies outside of the operational bandwidth of the UE is compatible with the one or more sets of analog beamforming beam weights associated with the operational bandwidth based at least in part on measuring the array gain for the one or more signals in the range of frequencies outside of the operational bandwidth of the UE.

16. The UE of claim 12, wherein the one or more sets of analog beamforming beam weights include at least one of:
a phase shifter parameter,
an amplitude control parameter, or
a combination thereof.

17. The UE of claim 12, wherein the one or more processors are further configured to:
transmit, to the base station, a request for beam training over the operational bandwidth and the range of frequencies outside of the operational bandwidth; and
receive, from the base station, an indication of multiple reference signals to be used for beam training over the operational bandwidth and the range of frequencies outside of the operational bandwidth.

18. The UE of claim 17, wherein the indication of multiple reference signals to be used for beam training includes an indication that a first reference signal is quasi co-located with a first set of resource blocks and an indication that a second reference signal is quasi co-located with a second set of resource blocks, wherein the resource blocks of the first set of resource blocks and the second set of resource blocks are within the operational bandwidth or the range of frequencies outside of the operational bandwidth.

19. The UE of claim 12, wherein the one or more processors are further configured to:
determine that a signal is received by the UE using a frequency that is not included in the operational bandwidth or in the range of frequencies outside of the operational bandwidth; and
determine that the signal is associated with a different one or more sets of analog beamforming beam weights based at least in part on determining that the signal is received using the frequency that is not included in the operational bandwidth or in the range of frequencies outside of the operational bandwidth.

20. The UE of claim 12, wherein the one or more sets of analog beamforming beam weights are included in an analog beamforming codebook.

21. The UE of claim 20, wherein the analog beamforming codebook is populated in a memory of one or more radio-frequency integrated circuits of the UE.

22. The UE of claim 12, wherein the one or more processors, to communicate with the base station, are configured to:
communicate, with the base station, using an operating frequency in a millimeter wave band.

23. A non-transitory computer-readable medium storing a set of instructions for wireless communication, the set of instructions comprising:
one or more instructions that, when executed by one or more processors of a user equipment (UE), cause the UE to:
transmit, to a base station, an indication of a range of frequencies outside an operational bandwidth of the UE based at least in part on the range of frequencies being compatible with one or more sets of analog beamforming beam weights associated with the operational bandwidth; and
communicate, with the base station, based at least in part on transmitting the indication of the range of frequencies outside of the operational bandwidth of the UE.

24. The non-transitory computer-readable medium of claim 23, wherein the one or more instructions further cause the UE to:
measure an array gain for one or more signals in the range of frequencies outside of the operational bandwidth of the UE using the one or more sets of analog beamforming beam weights associated with the operational bandwidth; and determine that the range of frequencies outside of the operational bandwidth of the UE is compatible with the one or more sets of analog beamforming beam weights associated with the operational bandwidth based at least in part on measuring the array gain for the one or more signals in the range of frequencies outside of the operational bandwidth of the UE.

25. The non-transitory computer-readable medium of claim 23, wherein the one or more instructions further cause the UE to:

transmit, to the base station, a request for beam training over the operational bandwidth and the range of frequencies outside of the operational bandwidth; and receive, from the base station, an indication of multiple reference signals to be used for beam training over the operational bandwidth and the range of frequencies outside of the operational bandwidth.

26. The non-transitory computer-readable medium of claim 23, wherein the one or more instructions further cause the UE to:

determine that a signal is received by the UE using a frequency that is not included in the operational bandwidth or in the range of frequencies outside of the operational bandwidth; and determine that the signal is associated with a different one or more sets of analog beamforming beam weights based at least in part on determining that the signal is received using the frequency that is not included in the operational bandwidth or in the range of frequencies outside of the operational bandwidth.

27. An apparatus for wireless communication, comprising:

means for transmitting, to a base station, an indication of a range of frequencies outside an operational bandwidth of the apparatus based at least in part on the range of frequencies being compatible with one or more sets of analog beamforming beam weights associated with the operational bandwidth; and means for communicating, with the base station, based at least in part on transmitting the indication of the range of frequencies outside of the operational bandwidth of the apparatus.

28. The apparatus of claim 27, further comprising:

means for measuring an array gain for one or more signals in the range of frequencies outside of the operational bandwidth of the apparatus using the one or more sets of analog beamforming beam weights associated with the operational bandwidth; and means for determining that the range of frequencies outside of the operational bandwidth of the apparatus is compatible with the one or more sets of analog beamforming beam weights associated with the operational bandwidth based at least in part on measuring the array gain for the one or more signals in the range of frequencies outside of the operational bandwidth of the apparatus.

29. The apparatus of claim 27, further comprising:

means for transmitting, to the base station, a request for beam training over the operational bandwidth and the range of frequencies outside of the operational bandwidth; and means for receiving, from the base station, an indication of multiple reference signals to be used for beam training over the operational bandwidth and the range of frequencies outside of the operational bandwidth.

30. The apparatus of claim 27, further comprising:

means for determining that a signal is received by the apparatus using a frequency that is not included in the operational bandwidth or in the range of frequencies outside of the operational bandwidth; and means for determining that the signal is associated with a different one or more sets of analog beamforming beam weights based at least in part on determining that the signal is received using the frequency that is not included in the operational bandwidth or in the range of frequencies outside of the operational bandwidth.

* * * * *